US008536576B2

(12) United States Patent
Tanahara

(10) Patent No.: US 8,536,576 B2
(45) Date of Patent: Sep. 17, 2013

(54) ARRAY SUBSTRATE AND DISPLAY DEVICE

(75) Inventor: Manabu Tanahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/398,129

(22) Filed: Feb. 16, 2012

(65) Prior Publication Data
US 2012/0211756 A1 Aug. 23, 2012

(30) Foreign Application Priority Data

Feb. 23, 2011 (JP) ................. 2011-037165

(51) Int. Cl.
H01L 29/04 (2006.01)
H01L 31/20 (2006.01)
(52) U.S. Cl.
USPC .................. 257/59; 257/72; 438/27
(58) Field of Classification Search
USPC .......... 257/59, 72, E27.121; 438/27
See application file for complete search history.

(56) References Cited

U.S. PATENT DOCUMENTS 8,045,074 B2 10/2011 Tanahara
2010/0163284 A1* 7/2010 Tanahara .................. 174/255

FOREIGN PATENT DOCUMENTS

| JP | 11-119246 | 4/1999 |
| JP | 2007-271803 | 10/2007 |
| JP | 2010-152091 | 7/2010 |

* cited by examiner

Primary Examiner — Theresa T Doan
(74) Attorney, Agent, or Firm — Oblon, Spivak, McClelland, Maier & Neustadt, L.L.P.

(57) ABSTRACT

An array substrate includes: a plurality of display areas, an outer area of the display area, in which a common wiring and an external connection terminal, which is connected to one of the scanning wiring, the signal wiring, and the common wiring, are provided; a connection wiring, which connects the external connection terminal with the common wiring of an adjacent display panel; and a connection part, which has a contact hole provided at the common wiring of the adjacent display panel, wherein the connection wiring is disposed across the cutting position of the insulation substrate and is connected to the contact hole at the connection part, and wherein the connection part is disposed at an area, at which a sealing member to bond an opposite substrate disposed to face the display area, or the inner side of the sealing member, which is the display area side.

5 Claims, 17 Drawing Sheets

35

ARRAY SUBSTRATE AND DISPLAY DEVICE

CROSS-REFERENCE TO RELATED APPLICATION

This application claims priority from Japanese Patent Application No. 2011-037165 filed on Feb. 23, 2011, the entire subject matter of which is incorporated herein by reference.

TECHNICAL FIELD

This disclosure relates to an array substrate and a display device. Specifically, this disclosure relates to a wiring configuration as an electrostatic countermeasure for and a corrosion countermeasure of the array substrate and the display device in which a plurality of display areas are disposed on a single substrate.

BACKGROUND

Recently, a display device is used as an information display device in various apparatuses. As a display panel (a main component having a display area) of a recent representative display device, new display panels using a liquid crystal, a plasma, an electro luminescence (EL), and a field emission display (FED), etc., are mainly used instead of a cathode-ray tube, which has been known as a conventional mainstream. The new display panels include a plurality of pixels disposed in a matrix form in the display area, in which the pixel is a basic unit forming an image. Generally, the display area is a plane surface (flat surface) and the thickness of the display device may be made thinner.

With taking the active matrix liquid crystal display, which is the most representative display device at present, as an example, a plurality of display areas are formed on a mother-substrate, which is configured by an insulation substrate made of, for example, transparent glass or plastic. A plurality of scanning wirings or signal wirings are disposed to cross each other in each display area and pixels having a thin film transistor, which is a switching element, and a pixel electrode are disposed in a matrix form in the near-region thereof. By the manufacturing process, the mother-substrate is formed as an array substrate including, for example, scanning wirings, signal wirings, thin film transistors, pixel electrodes, various kinds of wirings, and terminals. The array substrate having the size of the mother-substrate is bonded with an opposite substrate disposed so as to face the display area with a gap of about several μm, and then it is cut and separated. Accordingly, many sheets of liquid crystal panels (display panel) may be acquired. The liquid crystal is injected into the gap between the array substrate and the opposite substrate.

Herein, in a manufacturing process from bonding the array substrate and the opposite substrate at the size of the mother-substrate with each other to cutting and separating for acquiring many sheets of liquid crystal panels and a manufacturing process before mounting a driving circuit and an external circuit, for example, it may be caused that a discharge breakdown in which the wirings such as the scanning wiring and the signal wiring on the array substrate are disconnected or shorted by static electricity from the outside. Further, it may be caused that a characteristic change (such as change in the threshold values) in the thin film transistor occurred and a discharge-broken down of a gate insulating layer.

In view of the above, JP-A-1999-119246 discloses a configuration in which at the near-region of the cutting part where the array substrate is cut and separated into each liquid crystal panel, a short wiring (short ring) is provided for commonly connecting lead-out wirings of the plurality of scanning wirings or signal wirings for electrostatic protection. By commonly connecting the scanning wirings or the signal wirings, charges generated by static electricity are distributed and a potential difference between the wirings becomes smaller, so that the discharge breakdown between the wirings is suppressed.

In general, the forming area of the short wiring is discarded when several sheets of display panels are cut and separated from the mother-substrate.

Meanwhile, in view of lowering costs of the display device, it is preferred that many display panels may be acquired from one sheet of mother-substrate as possible. For example, JP-A-2010-152091 discloses that, instead of the forming area of the short wiring, the wirings are connected to the common wiring of an adjacent panel. Since the common wiring of the adjacent panel also serves as the short wiring, the forming area of the short wiring that is discarded when being cut and separated from the mother-substrate will be omitted.

SUMMARY

However, as described in JP-A-2010-152091, when the connection wiring, which is extended from the external connection terminal of the scanning wiring or the signal wiring, and the common wiring of the adjacent display panel are connected with each other through the connection part having the contact hole of the common wiring of the adjacent display panel, since the film thickness of the connection wiring tends to become thinner in the contact hole (particularly, a step part) of the connection part, a coating (coverage) defect or a pin hole easily occurs. Accordingly, the corrosion of the common wiring may occur through the defect area of the connection part by moisture in air. In view of the above, this disclosure suppresses the corrosion from occurring in the common wiring in the connection part having the contact hole of the common wiring, so that the reliability of display panels is improved.

With considering above, an array substrate of this disclosure comprising: a plurality of display areas, which is disposed on an insulation substrate, and which respectively configures a display panel, wherein a plurality of pixels is provided in a matrix form in the display areas and respectively includes a switching element and a pixel electrode disposed in a region, in which a scanning wiring and a signal wiring cross each other; an outer area of the display area, in which a common wiring, which is configured to apply a reference potential to the pixels, and an external connection terminal, which is connected to one of the scanning wiring, the signal wiring, and the common wiring, are provided; a connection wiring, which connects the external connection terminal with the common wiring of an adjacent display panel; and a connection part, which has a contact hole provided at the common wiring of the adjacent display panel, wherein the connection wiring is disposed across the cutting position of the insulation substrate and is connected to the contact hole at the connection part, and wherein the connection part is disposed at an area, at which a sealing member to bond an opposite substrate disposed to face the display area, or the inner side of the sealing member, which is the display area side.

According to this disclosure, it is possible to increase the number of the display panels acquired from the array substrate having the size of one sheet of mother-substrate before cutting and separating, and concurrently prevent the corrosion of the common wiring in the connection part having the contact hole formed at the common wiring of the adjacent display panel connected with the connection wiring, so that the reliability of display panels is improved.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
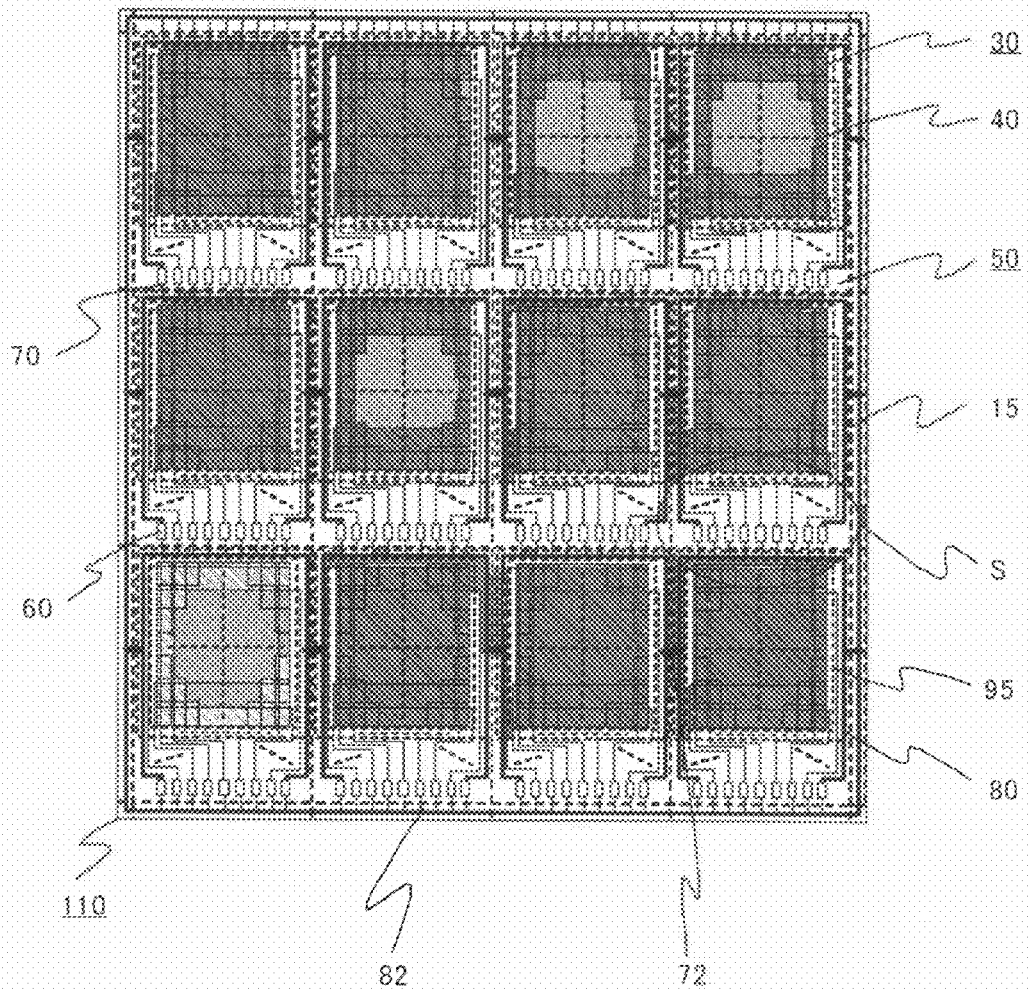
FIG. 1 is a plan view illustrating a schematic configuration of an array substrate corresponding to a layout of a plurality of liquid crystal panels according to of this disclosure.

Hereinafter, illustrative embodiments for an array substrate and a liquid crystal display according to this disclosure will be described with reference to the drawings. Meanwhile, in each drawing for describing the following illustrative embodiments, since the same reference numeral indicates the same or similar portion, the duplicated description is appropriately omitted.

First Illustrative Embodiment

Figure 2:
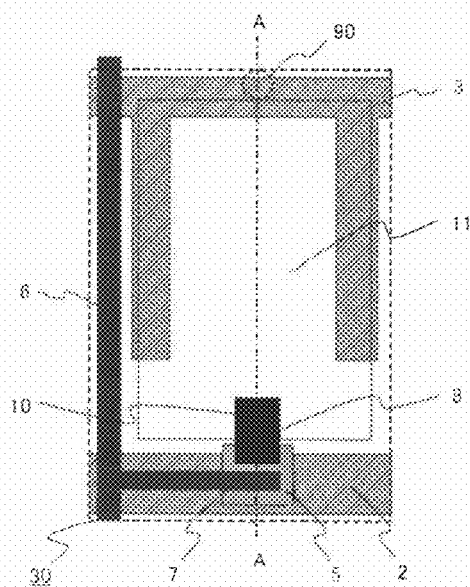
FIG. 2 is an enlarged plan view illustrating a pixel of the array substrate, which configuring a display area of the liquid crystal panel shown in FIG. 1.
Figure 3:
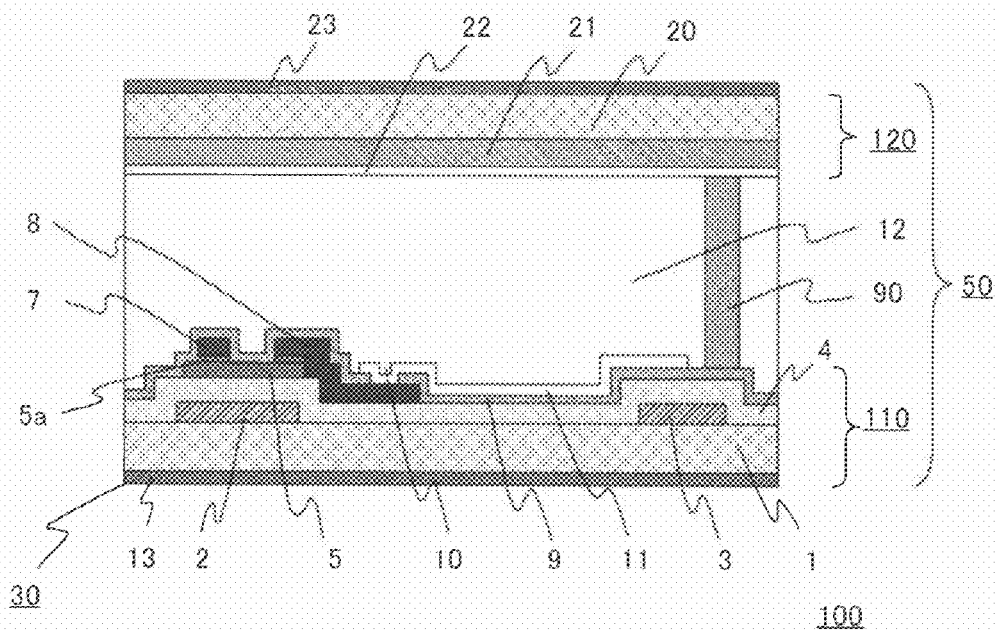
FIG. 3 illustrates a cross-sectional view taken along line A-A of FIG. 2.
Figure 4:
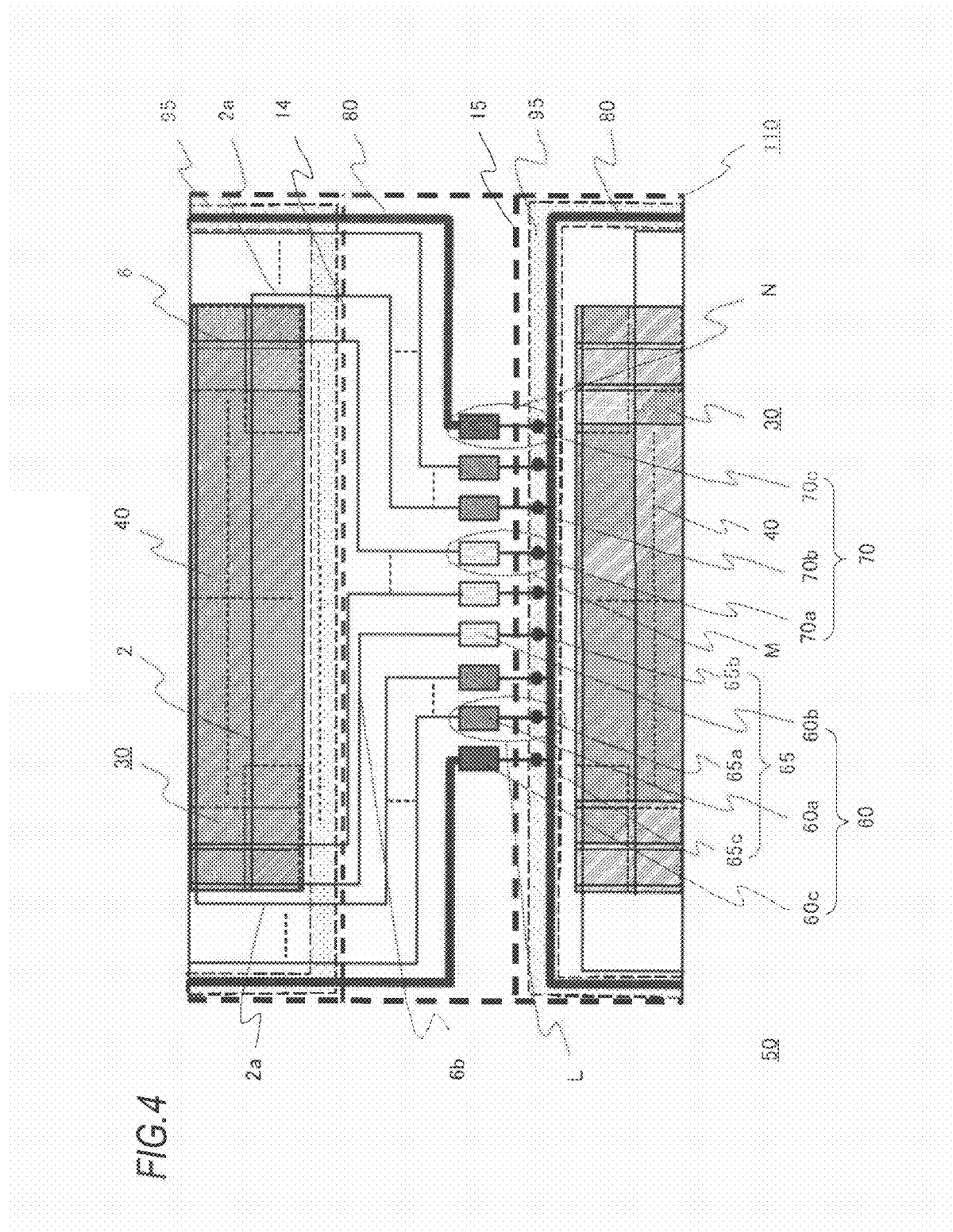
FIG. 4 is an enlarged plan view illustrating a cutting near-region S where liquid crystal panels, which are adjacent in an up-down direction, are cut off in the array substrate according to the first illustrative embodiment of this disclosure.

FIG. 1 is a plan view illustrating a schematic configuration of an array substrate corresponding to a layout of a plurality of liquid crystal panels according to a first illustrative embodiment of this disclosure. FIG. 2 is an enlarged plan view illustrating a pixel of the array substrate, configuring a display area of the liquid crystal panel shown in FIG. 1. FIG. 3 illustrates a cross-sectional view taken along line A-A of FIG. 2. FIG. 4 is an enlarged plan view illustrating a cutting near-region S where liquid crystal panels, which are adjacent in the up-down direction, are cut off in the array substrate in FIG. 1.

In the first illustrative embodiment, a display device is a liquid crystal display 100. Referring to FIGS. 1 to 3, an array substrate 110, having the size of the mother-substrate, including a plurality of display areas (e.g., 12 display areas in FIG. 1) in which a plurality of pixels 30 are disposed in a matrix form and an opposite substrate (color filter substrate) 120 facing the display areas 40 are disposed with a gap of about 2 to 5 μm by a spacer 90 made of a resin material, and the substrates are to be bonded with each other by forming a sealing member 95 around the display areas 40. A liquid crystal 12 is injected into the gap, and a number (12 sheets in FIG. 1) of liquid crystal panels 50 may be acquired by cutting and separating the bonded substrates at the position of the cutting lines 15. In a subsequent process, although not shown, the liquid crystal panel 50 is mounted by or connected with, for example, a driving circuit (driver 1C), and an external circuit to be housed in a case body, thereby being assembled to form the liquid crystal display 100.

Herein, external connection terminals 60 on the array substrate 110, which has the size of the mother-substrate, being one side substrate of the liquid crystal panel 50 are commonly connected to a common wiring 80 of the adjacent liquid crystal panel 50 by a connection wiring 70, before being cut and separated from the position of the cutting line 15. In FIG. 1, the external connection terminal 60 is connected to the common wiring 80 of the liquid crystal panel 50 adjacent to the lower side thereof. However, the liquid crystal panel 50 disposed at the lower side of the outermost circumference is excepted because the liquid crystal panel 50 adjacent to the lower side thereof does not exist. Instead of that, a short wiring 82 connected to the common wiring 80 is disposed around the outermost circumference of the array substrate 110 having the size of the mother-substrate, before cutting and separating. Therefore, the external connection terminal 60 is connected to the short wiring 82.

In FIG. 1, an auxiliary connection wiring 72 that connects the common wirings 80 of the liquid crystal panels 50 which are adjacent to the left-right direction is also disposed.

Hereinafter, manufacturing methods and configurations of the array substrate 110 and the liquid crystal display 100 according to the first illustrative embodiment will be briefly described. Herein, as the most general example, the configuration for a manufacturing process using five Photo-Engraving Processes (PEP) to form an amorphous Si thin film transistor will be described.

First, on an insulating substrate 1 which is a mother-substrate made of glass, plastic, or the like, a first metallic thin film made of metal of Al, Cu, Cr, Mo, Ta, Ti, W, or the like or an alloy thereof is formed by a sputtering or the like, a scanning wiring 2, a scanning lead-out wiring 2a, a common wiring 80, a common electrode 3 forming auxiliary capacitance, and the like is formed in a predetermined pattern. Herein, the common wiring 80 is a wiring (lead-out wiring) commonly connecting the common electrode 3, and when the liquid crystal 12 of the liquid crystal panel 50 is AC-driven, a reference potential (central potential) is applied to the common wiring 80.

Subsequently, a gate insulating layer 4 made of SiNx, SiOx, or the like, a semiconductor active layer 5, and an ohmic contact layer 5a are continuously formed in a predetermined pattern by a plasma CVD or the like, and the semiconductor active layer 5 and the ohmic contact layer 5a is formed. Herein, the pattern is formed in a rectangular island shape.

Subsequently, a second metallic thin film made of metal of Al, Cu, Cr, Mo, Ta, Ti, W, or the like or an alloy thereof is formed by sputtering or the like, and a signal wiring 6, a signal lead-out wiring 6a, a source electrode 7, a drain electrode 8, and the like is formed in a predetermined pattern.

Next, a passivation layer 9 made of SiNx, SiOx, or the like is formed by plasma CVD or the like, and a contact hole 10 on the drain electrode 8 is formed. In this case, although described below, even in the external connection terminals 60 (connection terminal for a flexible substrate) of the scanning wiring 2, the signal wiring 6, the common wiring 80, and the like or a connection part of the connection wiring 70 and the common wiring 80, the contact hole also penetrates through the gate insulating layer 4 and the passivation layer 9.

Next, a pixel electrode 11 is formed on the passivation layer 9 by sputtering or the like. The pixel electrode 11 is connected to the drain electrode 8 through the contact hole 10 penetrating through the passivation layer 9. In a transmissive type liquid crystal display 100, the pixel electrode 11 is formed by a transparent oxide conductive layer made of indium tin oxide (ITO) or the like. Herein, an overlapping portion of the common electrode 3 and the pixel electrode 11 configures an auxiliary capacitance.

In a reflective type liquid crystal display 100, the pixel electrode 11 is formed by a metallic layer made of Al, Ag, or the like having high reflection. In a transflective type liquid crystal display 100, the pixel electrode 11 is configured by two areas including a transmissive area formed by the transparent oxide conductive layer and a reflective area formed by the metallic layer having high reflection, not one material and one area.

The opposite substrate 120, in which red, blue, and green color filters 21 and an opposite electrode 22 made of the transparent oxide conductive layer such as ITO are formed on the glass substrate 20, has approximately the size of the mother-substrate. By facing the array substrate 110 having the size of the mother-substrate, where the plurality of display areas 40 are disposed, and by forming a sealing member 95 made of a resin, around each display area 40, the opposite substrate 120 is bonded with the array substrate 110 with a gap of about 2 to 5 μm by a spacer 90 made of a resin material. The liquid crystal 12 is injected into the gap of the display area 40 which is in the inside of the sealing member 95.

As described above, the opposite substrate 120 is also formed on the glass substrate 20 having substantially the same size as the array substrate 110. While the array substrate 110 and the opposite substrate 120 are bonded with each other, several sheets (12 sheets in FIG. 1) of the liquid crystal panels 50 may be acquired by cutting at the position of the cutting lines 15 and separating into the plurality of liquid crystal panels 50.

In order to improve uniformity of the gap where the liquid crystal 12 is injected between the opposite substrate 120 and the array substrate 110 or in the transflective type liquid crystal display 100, a flatten layer made of a transparent resin to control the gap of the reflective area may be formed between the color filter 21 and the opposite electrode 22. Meanwhile, in an in-plane switching (horizontal switching) mode, the opposite electrode 22 is formed on the array substrate 110.

In order to mount and connect a driving circuit or an external circuit on the liquid crystal panel 50, in the near-region of the external connection terminal 60 outside the display area 40 on the array substrate 110, the area of the opposite substrate 120 between the cutting line 15 and an opposite substrate cutting line 14 is removed, so that the surface of the array substrate 110 is exposed.

In FIG. 3, although not shown, an alignment layer is coated on each of the interfaces facing the liquid crystal 12 of the array substrate 110 and the opposite substrate 120 to control the alignment direction of the liquid crystal 12. Polarizers 13 and 23 are attached to the surface and the back surface of the liquid crystal panel 50. The driving circuit or the external circuit that drives the liquid crystal panel 50 is mounted and connected, and in the transmissive type, a backlight is disposed at the lower side (rear side) of the array substrate 110. Finally, the liquid crystal panel 50 is assembled by, for example, being housed in a case body, thereby being completed the liquid crystal display 100.

Next, descriptions will be made for FIG. 4 which is an enlarged plan view illustrating a cutting near-region S of the array substrate 110 having the size of the mother-substrate for acquiring several sheets of the liquid crystal panels 50. In FIG. 4, external connection terminals 60 (60a, 60b, and 60c) arranged in a wiring are connected to the scanning lead-out wiring 2a, the signal lead-out wiring 6b, and the common wiring 80, respectively. Connection wirings 70 (70a, 70b, and 70c) extending from the external connection terminals 60 are connected to the common wiring 80 of the liquid crystal panel 50 adjacent to the lower side thereof and to connection parts 65 (65a, 65b, and 65c) having the contact holes.

Herein, the scanning lead-out wirings 2a are alternately led out from the left and the right of the display area 40 based on the order of the even numbers and the odd numbers of the corresponding scanning wirings 2, but all of the scanning lead-out wirings 2a may be led out from any one side of the left and the right.

Since the connection wiring 70 is connected to the common wiring 80 of the adjacent liquid crystal panel 50 by the connection part 65, the scanning wiring 2 and the signal wiring 6 are commonly connected to the common wiring 80, so that the common wiring 80 of the adjacent liquid crystal panel 50 also serves as a short wiring. Accordingly, since a separate forming area of the short wiring does not need to be provided between the adjacent liquid crystal panels 50, when several sheets of the liquid crystal panels 50 with the array substrate 110 having the size of the mother-substrate and the opposite substrate 120 bonded with each other are cut and separated at the position of the cutting line 15, the areas to be discarded is reduced, and the sheet number of the liquid crystal panels 50 acquired from one sheet of mother-substrate may increase.

It is one of the most important that the connection part 65 having the contact hole of the common wiring 80 is disposed at the area where the sealing member 95 for bonding with the opposite substrate 120 is formed. Meanwhile, the width of the sealing member 95 is about 0.5 mm or larger generally. In the plan view and the cross-sectional view enlarging the near-region of the connection part 65 as described below, a part of the area where the sealing member 95 is formed is indicated by the inside of a border represented by a dotted line.

Figure 5:
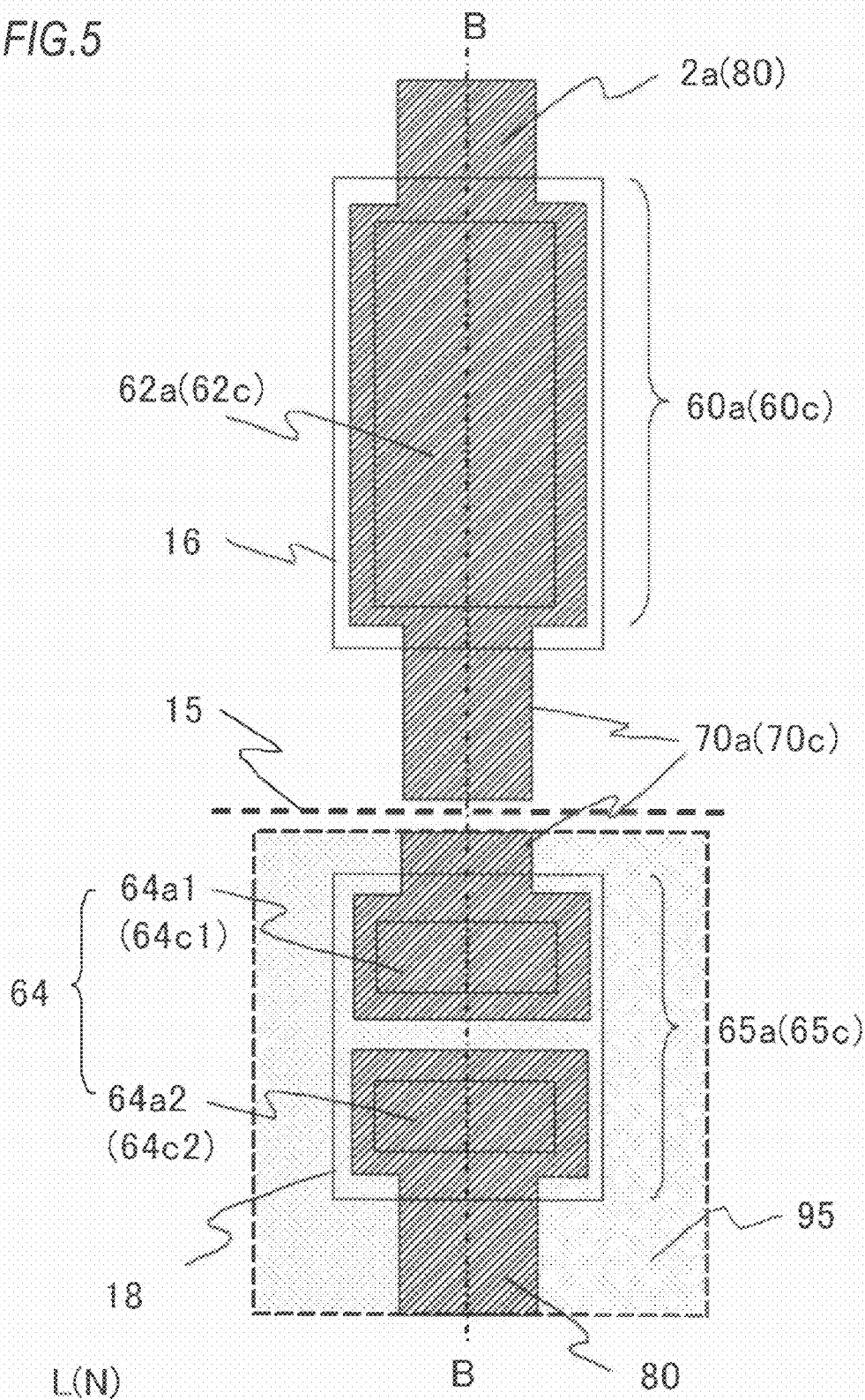
FIG. 5 is an enlarged plan view illustrating near-regions L and N of external connection terminal of a scanning wiring and a common wiring in the first illustrative embodiment of this disclosure.
Figure 6:
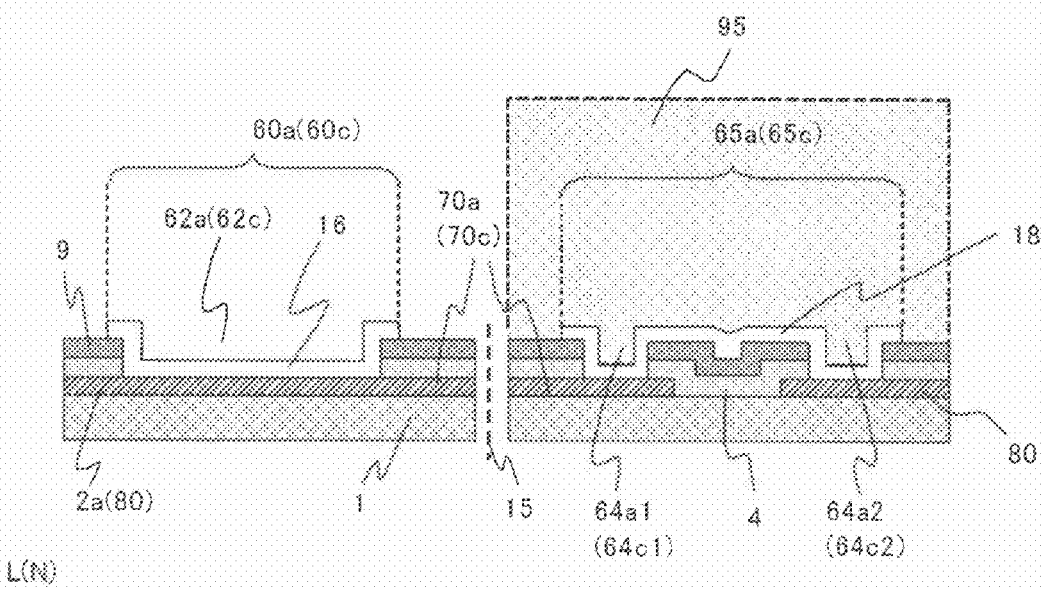
FIG. 6 illustrates a cross-sectional view taken along line B-B of FIG. 5.

Next, descriptions will be made for the external connection terminals 60a and 60c, connection wirings 70a and 70c and the connection parts 65a and 65c of the scanning wiring 2 led out by the scanning lead-out wiring 2a and the common wiring 80. FIG. 5 is an enlarged plan view illustrating near-regions L and N of external connection terminals of the scanning wiring 2 and the common wiring 80. FIG. 6 is a cross-sectional view taken along line B-B of FIG. 5.

The configurations of the near-regions L and N of external connection terminals are basically the same as each other. In the drawings, symbols with character "a" represent components in the near-region L of an external connection terminal of the scanning wiring 2 and symbols with character "c" represent components in the near-region N of an external connection terminal of the common wiring 80.

Next, the external connection terminal 60a of the scanning wiring 2 led out by the scanning lead-out wiring 2a and the external connection terminal 60c of the common wiring 80 are configured by two layers, and the lower layer is configured by the same layer as the scanning lead-out wiring 2a and the common wiring 80. An external connection terminal surface member 16 of the upper layer is formed at the same layer as the pixel electrode 11 made of a transparent oxide conductive layer such as ITO having excellent corrosion resistance as compared with the metallic layer.

The external connection terminal surface members 16 of the scanning wiring 2 and the common wiring 80 are connected with the lower layer through the contact holes 62a and 62c penetrating through the gate insulating layer 4 and the passivation layer 9. The connection wirings 70a and 70c connected to the common wiring 80 of the adjacent liquid crystal panel 50 are formed by the same layer where the scanning lead-out wiring 2a and the common wiring 80 extend as they are and connected to the connection parts 65a and 65c having the contact holes disposed at the area where the sealing member 95 of the adjacent liquid crystal panel 50 is formed.

In the connection part 65a of the scanning wiring 2, the connection wiring 70a is connected with the common wiring 80 of the adjacent liquid crystal panel 50 through two contact holes 64a1 and 64a2 penetrating through the gate insulating layer 4 and the passivation layer 9 by the connection layer 18 formed by the same layer as the external connection terminal surface member 16. The cutting line 15 is positioned in the middle of the connection wiring 70a.

In the connection part 65c of the common wiring 80, the connection wiring 70c is connected with the common wiring 80 of the adjacent liquid crystal panel 50 through two contact holes 64c1 and 64c2 penetrating through the gate insulating layer 4 and the passivation layer 9 by the connection layer 18 formed by the same layer as the external connection terminal surface member 16. The cutting line 15 is positioned in the middle of the connection wiring 70c.

Figure 7:
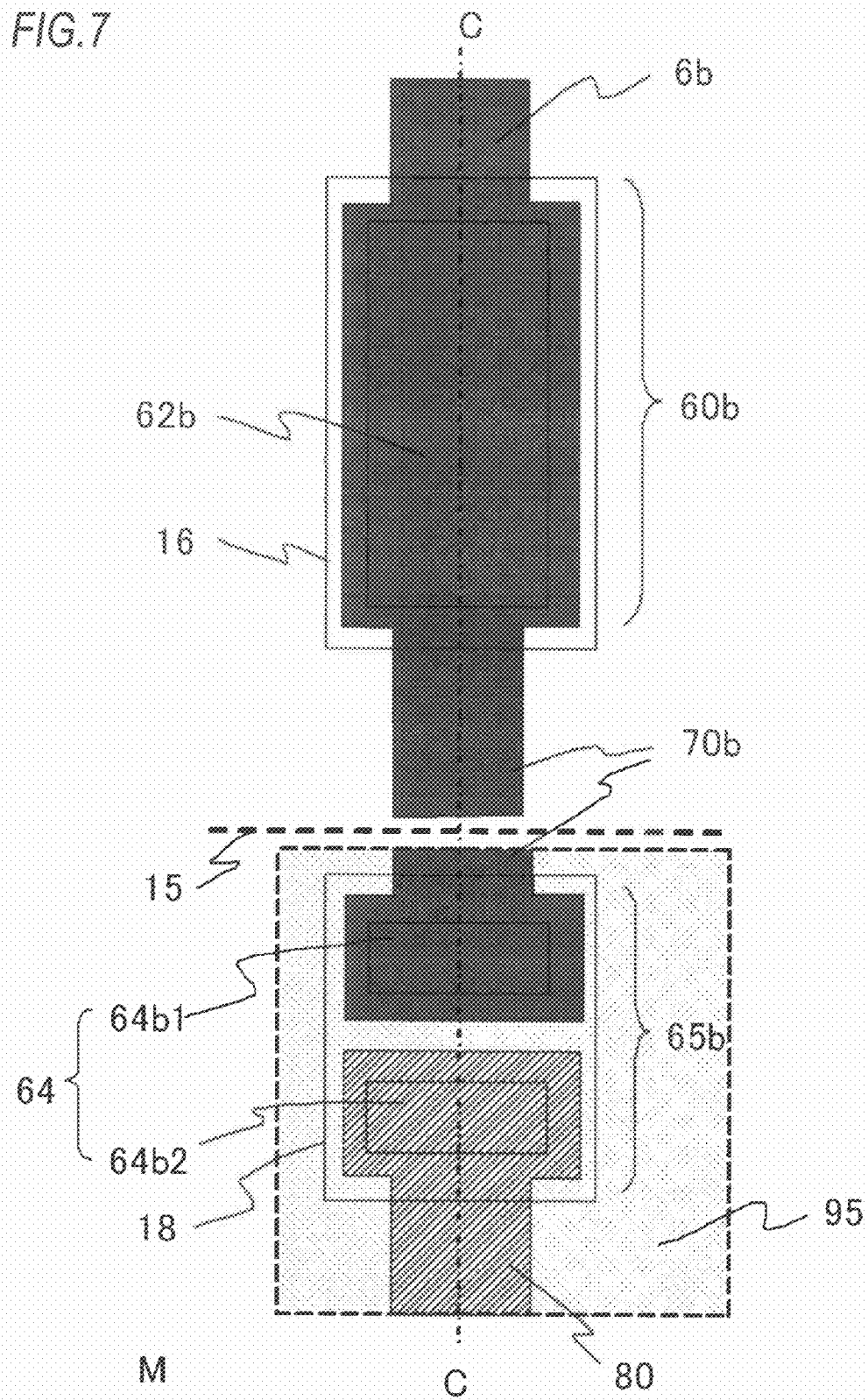
FIG. 7 is an enlarged plan view illustrating a near-region M of an external connection terminal of a signal wiring in the first illustrative embodiment of this disclosure.
Figure 8:
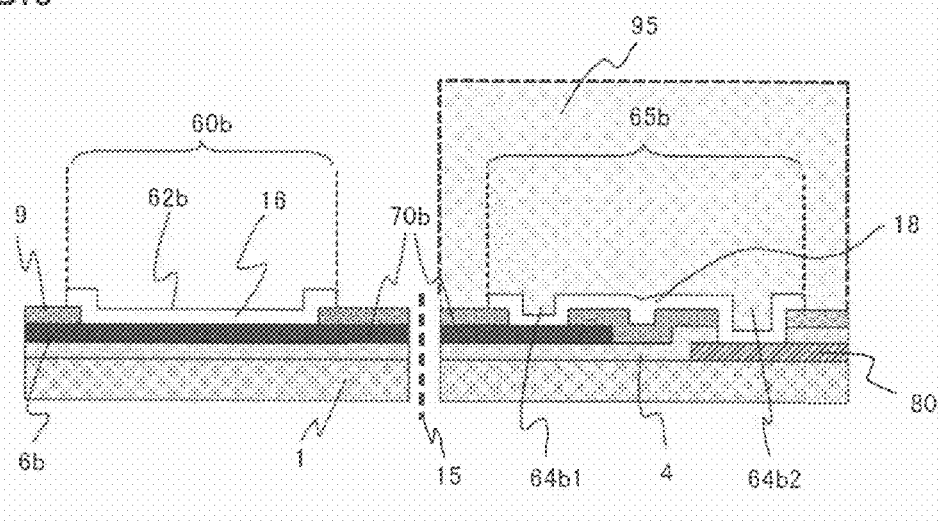
FIG. 8 illustrates a cross-sectional view taken along line C-C of FIG. 7.

Next, descriptions will be made for the external connection terminal 60b of the signal wiring 6 led out by the signal lead-out wiring 6b. FIG. 7 is an enlarged plan view illustrating an external connection terminal near-region M of the signal wiring 6. FIG. 8 illustrates a cross-sectional view taken along line C-C of FIG. 7.

The external connection terminal 60b of the signal wiring 6 led out by the signal lead-out wiring 6b is configured by two layers as in the external connection terminals 60a and 60c. The external connection terminal 60b is different from the external connection terminals 60a and 60c, because the lower layer is configured by the same layer as the signal wiring 6 and the signal lead-out wiring 6b. The external connection terminal surface member 16 of the upper layer is formed by the same layer as the pixel electrode 11 made of a transparent oxide conductive layer such as ITO. The external connection terminal surface member 16 is connected with the lower layer through the contact hole 62b penetrating through the passivation layer 9.

The connection wiring 70b connected to the common wiring 80 of the adjacent liquid crystal panel 50 is formed by the same layer where the signal lead-out wiring 6b extends as it is, and the connection wiring 70b is connected to the connection part 65b disposed at the area where the sealing member 95 of the adjacent liquid crystal panel 50 is formed.

In the connection part 65b of the signal wiring 6, the connection wiring 70b is connected with the common wiring 80 of the adjacent liquid crystal panel 50 through the contact hole 64b1 penetrating through the passivation layer 9 and the contact hole 64b2 penetrating through the gate insulating layer 4 and the passivation layer 9 by the connection layer 18 formed by the same layer as the external connection terminal surface member 16. The cutting line 15 is positioned in the middle of the connection wiring 70b.

Next, operation and effect of this disclosure will be described. As described above, in the first illustrative embodiment, it is important that the connection wiring 70 and the common wiring 80 are connected at the connection part 65 which is disposed at the area where the sealing member 95 for bonding with the opposite substrate 120 is formed. Since the connection part 65 having the contact hole 64 is disposed at the area where the sealing member 95 is formed, the connection part 65 is covered by the sealing member 95 to not contact with moisture in air which causes the corrosion. Accordingly, even if a coating defect or a defect such as a pin hole occurs in the connection layer 18 in the area of the contact hole 64, it is unlikely that the corrosion of the common wiring 80 below the defected area occurs.

In the first illustrative embodiment, since the connection wirings 70a and 70c are covered by the gate insulating layer 4 and the passivation layer 9, and the connection wiring 70b is covered by the passivation layer 9 as well, it is unlikely that the delamination of the connection wirings 70 (70a, 70b, and 70c) occurs when cutting the array substrate 110. It is also unlikely that the corrosion of the connection wirings 70 (70a, 70b, and 70c) occurs when using the liquid crystal display 100.

Meanwhile, in the first illustrative embodiment, when the connection wiring 70a (or, 70c) is configured by the same layer as the common wiring 80 of the adjacent liquid crystal panel 50, the connection part 65a (or, 65c) may also be configured without two contact holes 64a1 and 64a2 (or, 64c1 and 64c2) and the connection layer 18 as shown in FIGS. 5 and 6. That is, the connection wiring 70a (or, 70c) may also be configured to connect to the same layer as the common wiring 80 of the adjacent liquid crystal panel 50 without converting a layer.

Second Illustrative Embodiment

Figure 9:
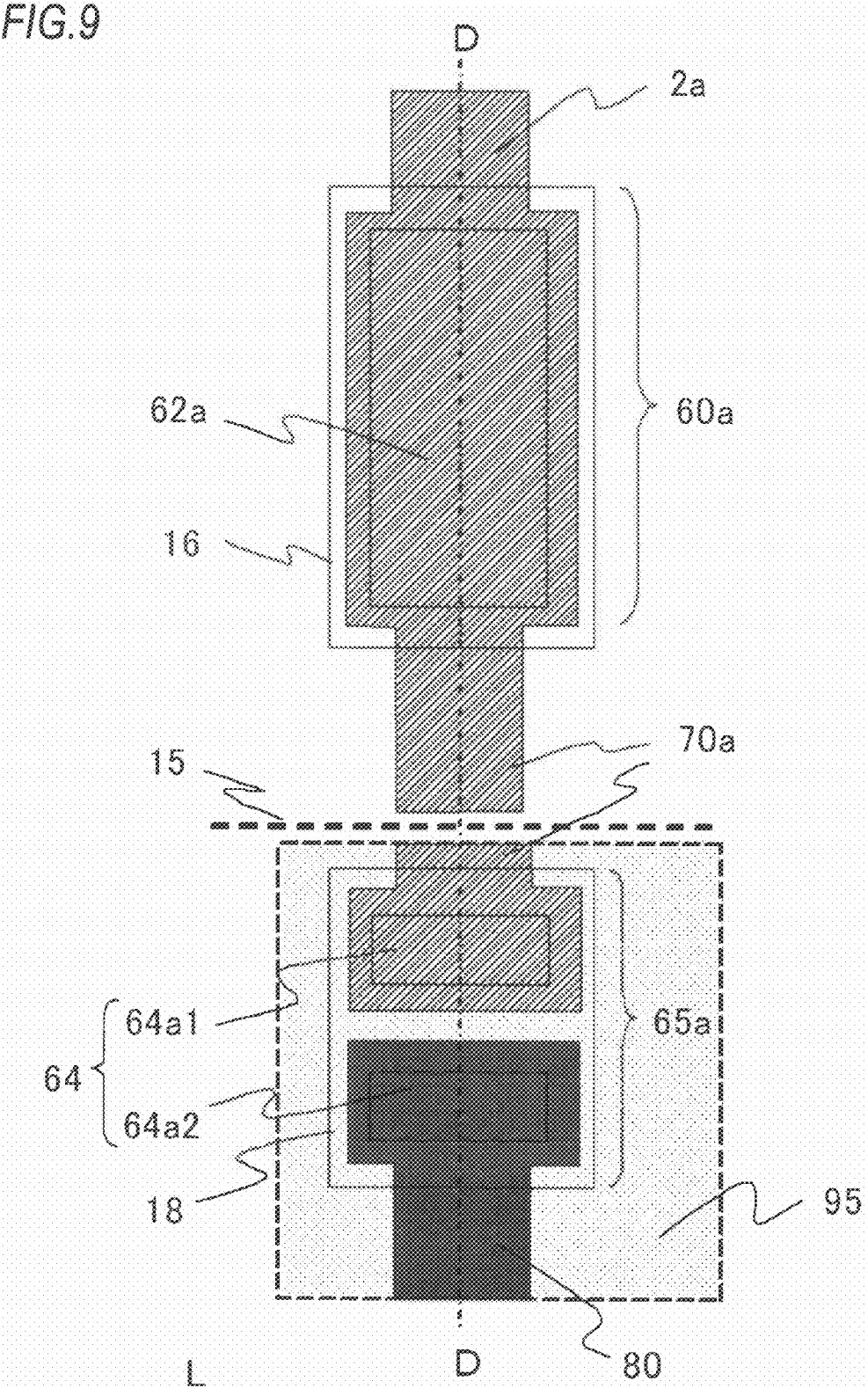
FIG. 9 is an enlarged plan view illustrating a near-region L of an external connection terminal of a scanning wiring in a second illustrative embodiment of this disclosure.
Figure 10:
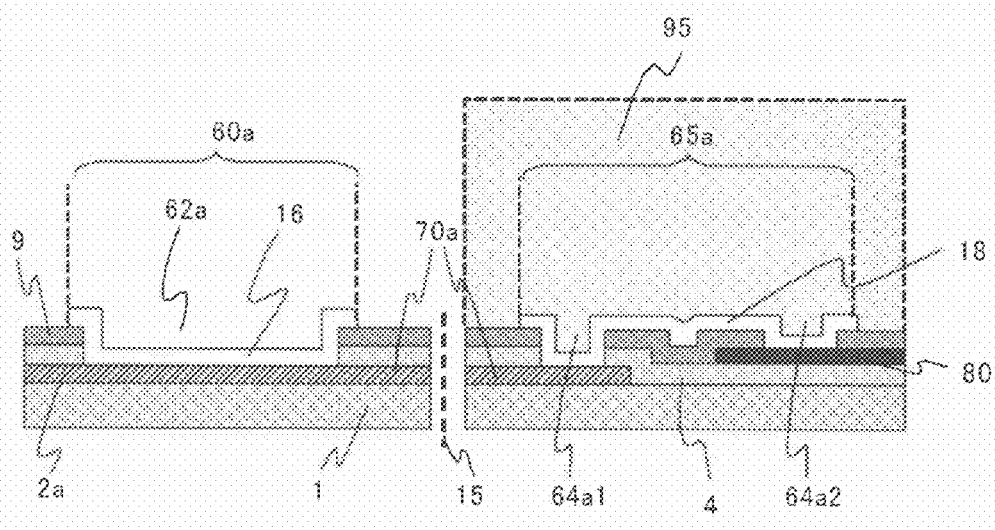
FIG. 10 illustrates a cross-sectional view taken along line D-D of FIG. 9.
Figure 11:
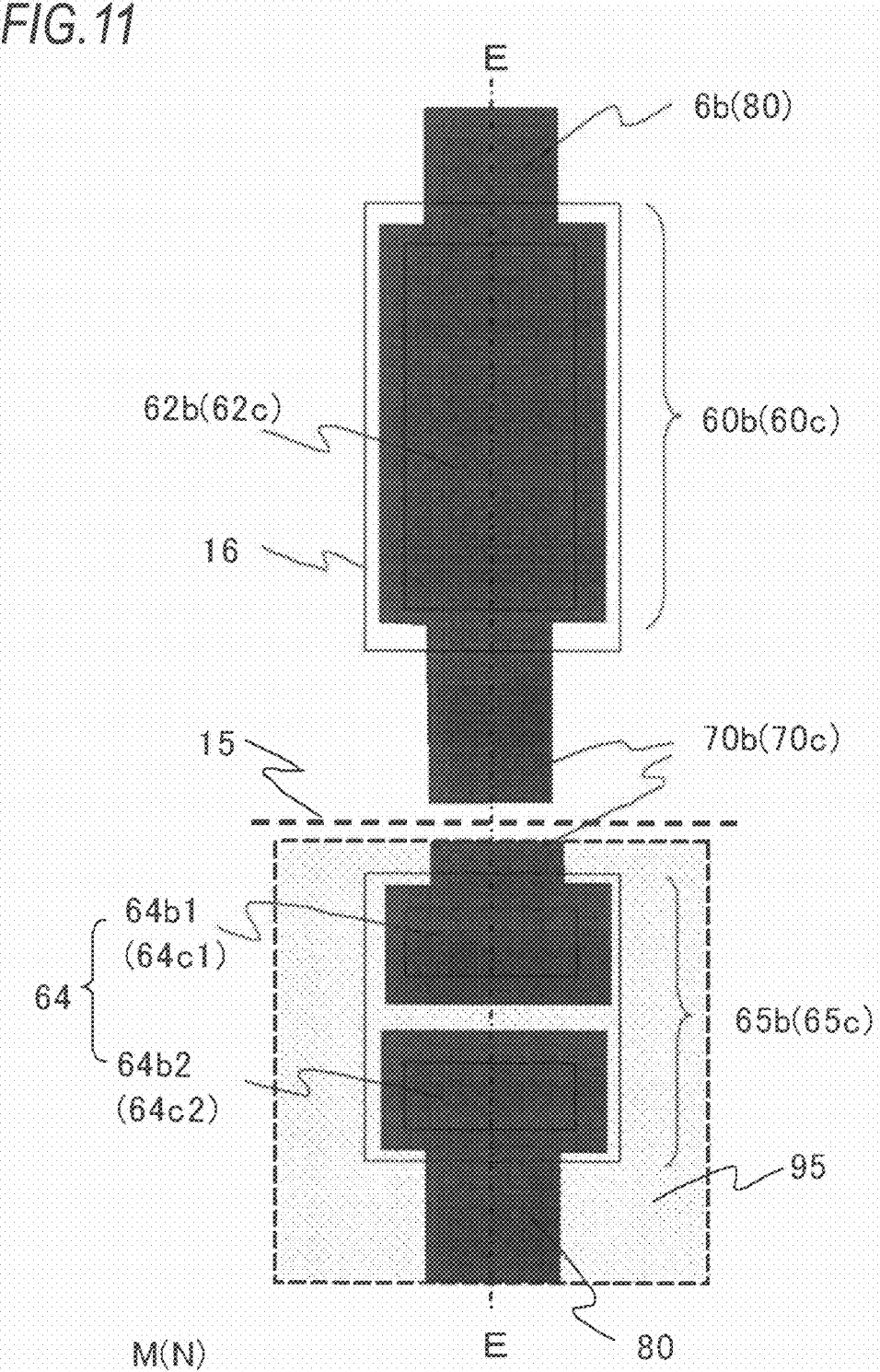
FIG. 11 is an enlarged plan view illustrating near-regions M and N of external connection terminals of a signal wiring and a common wiring in the second illustrative embodiment of this disclosure.
Figure 12:
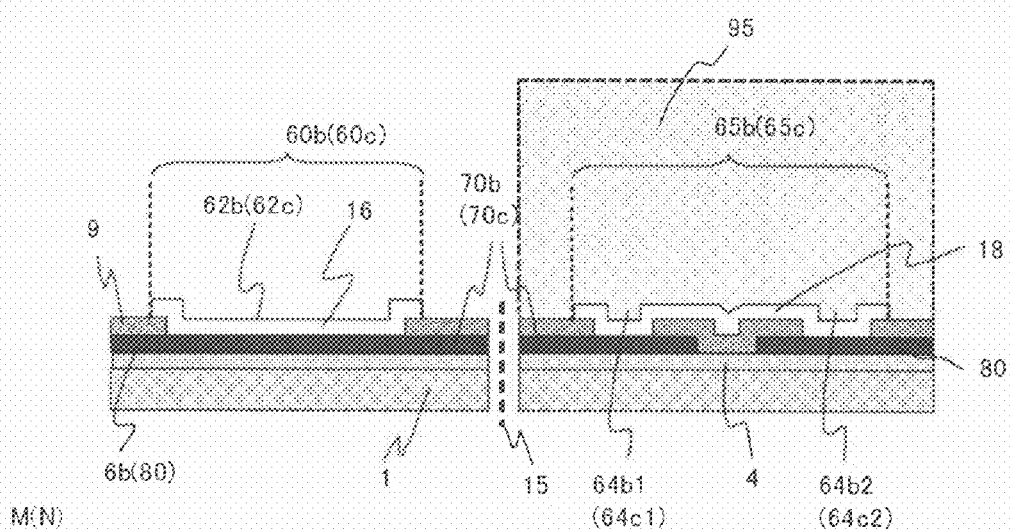
FIG. 12 illustrates a cross-sectional view taken along line E-E of FIG. 11.

FIG. 9 is an enlarged plan view illustrating a near-region L of an external connection terminal of a scanning wiring according to a second illustrative embodiment of this disclosure. FIG. 10 illustrates a cross-sectional view taken along line D-D of FIG. 9. FIG. 11 is an enlarged plan view illustrating near-regions M and N of external connection terminals of a signal wiring and a common wiring according to the second illustrative embodiment of this disclosure. FIG. 12 illustrates a cross-sectional view taken along line E-E of FIG. 11.

In the first illustrative embodiment, the conductive layer that configures the common wiring 80 is the same layer as the conductive layer that configures the scanning wiring 2 and the scanning lead-out wiring 2a. In the second illustrative embodiment, the conductive layer that configures the common wiring 80 is the same layer as the conductive layer that configures the signal wiring 6 and the signal lead-out wiring 6b.

First, an external connection terminal 60a a near-region L of the scanning wiring 2 will be described with reference to FIGS. 9 and 10.

The external connection terminal 60a of the scanning wiring 2 led out by the scanning lead-out wiring 2a is configured by two layers as in the first illustrative embodiment, and the lower layer is configured by the same layer as the scanning wiring 2 and the scanning lead-out wiring 2a. The external connection terminal surface member 16 of the upper layer is formed by the same layer as the pixel electrode 11 made of a transparent oxide conductive layer such as ITO having excellent corrosion resistance as compared with a metallic layer. The external connection terminal surface member 16 is connected with the lower layer through the contact hole 62a penetrating through the gate insulating layer 4 and the passivation layer 9. The connection wiring 70a to be connected to the common wiring 80 of the adjacent liquid crystal panel 50 is formed by the same layer where the scanning lead-out wiring 2a extends as it is, and the connection wiring 70a is connected to the connection part 65a disposed at the area where the sealing member 95 of the adjacent liquid crystal panel 50 is formed.

In the connection part 65a, the connection wiring 70a is connected with the common wiring 80 of the adjacent liquid crystal panel 50 by the connection layer 18 formed by the same layer as the external connection terminal surface member 16 through the contact hole 64a1 penetrating through the gate insulating layer 4 and the passivation layer 9 and the contact hole 64a2 penetrating through the passivation layer 9.

Next, the external connection terminals 60b and 60c near-regions M and N of the signal wiring 6 and the common wiring 80 will be described with reference to FIGS. 11 and 12.

The external connection terminal 60b of the signal wiring 6 led out by the signal lead-out wiring 6b, the external connection terminal 60c of the common wiring 80 are configured by two layers as in the first illustrative embodiment, respectively, and the lower layer is configured by the same layer as the signal wiring 6, the signal lead-out wiring 6b, and the common wiring 80. The external connection terminal surface member 16 of the upper layer is formed by the same layer as the pixel electrode 11 made of a transparent oxide conductive layer such as ITO. The external connection terminal surface member 16 is connected with the lower layer through the contact holes 62b and 62c penetrating through the passivation layer 9. The connection wirings 70b and 70c to be connected to the common wiring 80 of the adjacent liquid crystal panel 50 are formed by the same layer where the signal lead-out wiring 6b and the common wiring 80 extend as they are, and the connection wirings 70b and 70c are connected to the connection parts 65h and 65c disposed at the area where the sealing member 95 of the adjacent liquid crystal panel 50 is formed. In the connection parts 65b and 65c, the connection wirings 70b and 70c are connected with the common wiring 80 of the adjacent liquid crystal panel 50 through the contact holes 64b1 and 64b2 (or 64c1 and 64c2) penetrating through the passivation layer 9, by the connection layer 18 formed by the same layer as the external connection terminal surface member 16. The cutting line 15 is positioned in the middle of the connection wirings 70b and 70c.

Even in the second illustrative embodiment, since the connection parts 65 (65a, 65b, and 65c) are disposed at the area where the sealing member 95 of the adjacent liquid crystal panel 50 is formed, the connection part 65 is covered by the sealing member 95 to not contact with moisture in air causing the corrosion. Accordingly, it is unlikely that a coating defect of the connection layer 18 occurs or the corrosion of the common wiring 80 occurs below the defected area such as a pin hole in the contact hole 64, so that the reliability of the liquid crystal display 100 is improved.

In the second illustrative embodiment, since the connection wiring 70a is covered by the gate insulating layer 4 and the passivation layer 9 and the connection wirings 70b and 70c are covered by the passivation layer 9, it is unlikely that the delamination of the connection wirings 70 (70a, 70b, and 70c) occurs when cutting the array substrate 110 or the corrosion of the connection wirings 70 (70a, 70b, and 70c) occurs when using the liquid crystal display 100 occurs.

Third Illustrative Embodiment

In the first and second illustrative embodiments, the connection wiring 70 is formed by the same layer as the scanning wiring 2 or the signal wiring 6, but in the third illustrative embodiment, the connection wiring 70 is formed by the same layer as the pixel electrode 11.

Figure 13:
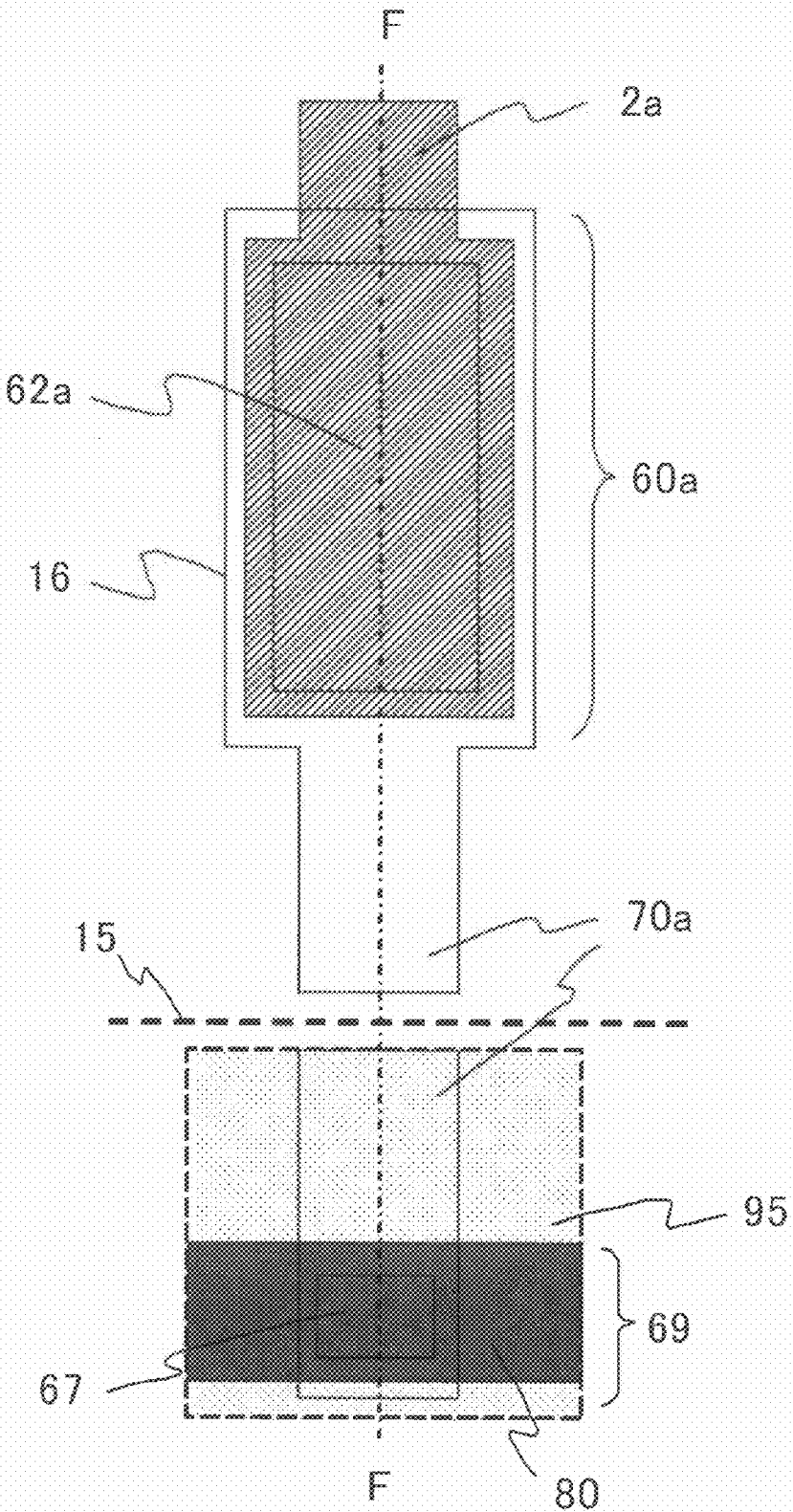
FIG. 13 is an enlarged plan view illustrating a near-region L of an external connection terminal of a scanning wiring in a third illustrative embodiment of this disclosure.
Figure 14:
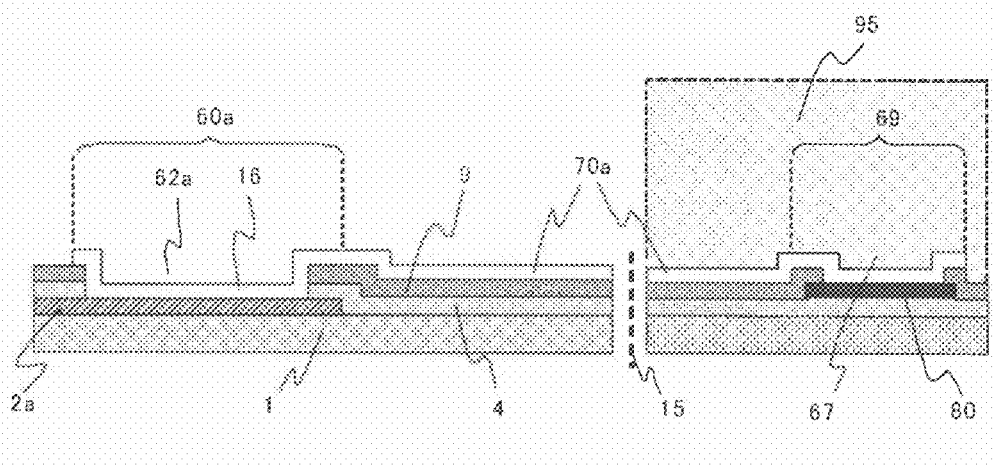
FIG. 14 illustrates a cross-sectional view taken along line F-F of FIG. 13.

FIG. 13 is an enlarged plan view illustrating a near-region L of an external connection terminal of a scanning wiring according to a third illustrative embodiment of this disclosure. FIG. 14 illustrates a cross-sectional view taken along line F-F of FIG. 13.

In FIGS. 13 and 14, the external connection terminal 60a of the scanning wiring 2 led out by the scanning lead-out wiring 2a is configured by two layers as in the first and second illustrative embodiments. In the third illustrative embodiment, the lower layer of the external connection terminal 60a of the scanning wiring 2 is the same layer as the scanning lead-out wiring 2a and connected to the external connection terminal surface member 16 configured by the same layer as the pixel electrode 11 made of the transparent oxide conductive layer such as ITO through the contact hole 62a. The connection wiring 70a, where the external connection terminal surface member 16 extends as it is, is formed and connected with the common wiring 80 configured by the same layer as the signal wiring 6 of the adjacent liquid crystal panel 50 in the connection part 69 disposed at the area where the sealing member 95 is formed through the contact hole 67 penetrating through the passivation layer 9.

In general, regardless of transparency or opaque, the oxide conductive layer has higher resistance than the metallic layer used in the scanning wiring 2 or the signal wiring 6, but has excellent corrosion resistance. Accordingly, in the case where the corrosion resistance of the connection wiring 70a exposed on the cut surface or the surface of the liquid crystal panel 50 is important, it is preferred that the connection wiring 70a is formed by the oxide conductive layer such as ITO.

Meanwhile, in the third illustrative embodiment, although the external connection terminal 60b of the signal wiring 6 and the external connection terminal 60c of the common wiring 80 are not shown, the connection wirings 70b and 70c where the external connection terminal surface member 16 made of the oxide conductive layer extends as it is, are formed and connected with the common wiring 80 of the adjacent liquid crystal panel 50 through the contact hole 67 penetrating through the passivation layer 9 in the connection part 69 disposed at the area where the sealing member 95 is formed, as shown in FIGS. 13 and 14.

Even in the third illustrative embodiment, since the connection part 69 is disposed at the area where the sealing member 95 is formed, the connection part 69 is not in contact with moisture in air causing the corrosion. Accordingly, it is unlikely that a coating defect of the connection wiring 70 occurs in the connection part 69 having the contact hole 67 or the corrosion of the common wiring 80 occurs below the defected area such as a pin hole, so that the reliability of the liquid crystal display 100 is improved.

As described above, in the case where the connection wiring 70 is made of the transparent oxide conductive layer such as ITO, since the connection wiring 70 has more excellent corrosion resistance than the metallic layer of the scanning wiring 2, the signal wiring 6, and the common wiring 80, so that it is unlikely that the actual corrosion occurs even if the connection wiring 70 is exposed on the surface of the array substrate 110.

Additionally, the connection wiring 70 may be not formed by the oxide conductive layer, and the connection wiring 70 may be formed by a conductive layer having more excellent corrosion resistance than the metallic layer of the scanning wiring 2, the signal wiring 6, and the common wiring 80.

Fourth Illustrative Embodiment

Figure 15:
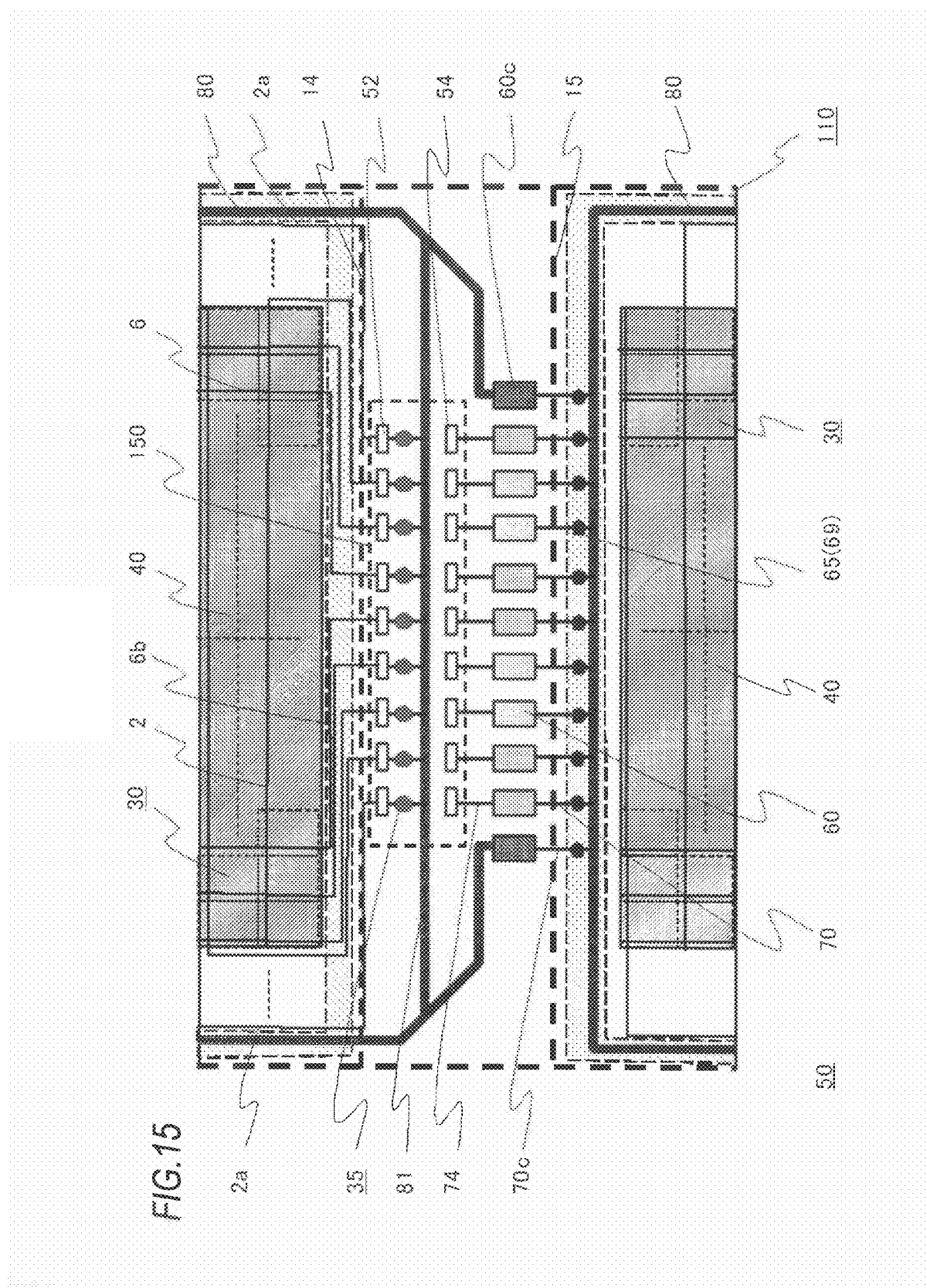
FIG. 15 is an enlarged plan view illustrating a cutting near-region S where liquid crystal panels, which are adjacent in the up-down direction, are cut off in an array substrate according to a fourth illustrative embodiment of this disclosure.
Figure 16:
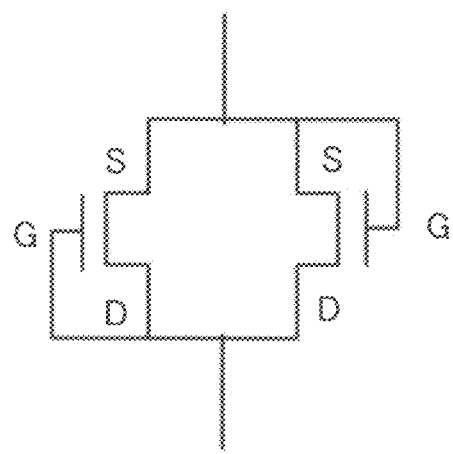
FIG. 16 illustrates an equivalent circuit diagram of a protection circuit of FIG. 15.

FIG. 15 is an enlarged plan view illustrating a cutting near-region S where liquid crystal panels, which are adjacent in the up-down direction, are cut off in an array substrate according to a fourth illustrative embodiment of this disclosure. FIG. 16 illustrates an equivalent circuit diagram of a protection circuit of FIG. 15.

In the first to third illustrative embodiments, the scanning wiring 2 and the signal wiring 6 are connected with the driving circuit or the external circuit through the external connection terminal 60. In the fourth illustrative embodiment, the driving circuit is directly mounted on the array substrate 110 by a chip on glass (COG).

In FIG. 15, a driving circuit 150 is directly mounted on the array substrate 110 by the COG. The mounted portion of the driving circuit 150 is shown by the dotted line. At the position corresponding to bump electrodes for output and input of the driving circuit 150 on the array substrate 110, a driving circuit output terminal 52 and a driving circuit input terminal 54 are formed. The driving circuit output terminal 52 and the driving circuit input terminal 54 are configured by two layers similarly to the external connection terminal 60 described in the first to third illustrative embodiments.

An auxiliary common wiring 81 branched from the common wiring 80 is disposed between the driving circuit output terminal 52 and the driving circuit input terminal 54. The driving circuit output terminal 52 is commonly connected to the auxiliary common wiring 81 through a protection circuit 35. Even in a manufacturing process before mounting the driving circuit 150 by the protection circuit 35 and the auxiliary common wiring 81, the driving circuit output terminal 52 connected to the scanning wiring 2 and the signal wiring 6 is commonly connected to the auxiliary common wiring 81 through the protection circuit 35, and the auxiliary common wiring 81 is connected to the common wiring 80. The driving circuit input terminal 54 is connected to the external connection terminal 60 by a driving circuit input wiring 74. The connection wiring 70 extending from the external connection terminal 60 is connected with the common wiring 80 of the adjacent liquid crystal panel 50.

As in the first to third illustrative embodiments, the common wiring 80 is connected to the external connection terminal 60c and connected with the common wiring 80 of the adjacent liquid crystal panel 50 by the connection wiring 70c.

FIG. 16 illustrates an equivalent circuit of the protection circuit 35. A diode is formed as a non-linear element by connecting a gate electrode G, and a source electrode S or a drain electrode D of the thin film transistor so as to dispose in parallel two diodes having opposite rectifying directions. In general, since the resistance of the diode is high, the current rarely flows, but if high voltage is applied by the static electricity, the current flows to any one diode according to plus or minus polarity of the static electricity to distribute charges caused by the static electricity generated in the scanning wiring 2 or the signal wiring 6 to the auxiliary common wiring 81 and the common wiring 80 via the protection circuit 35.

A high resistance layer made of, for example, a semiconductor layer where the current rarely flows in general driving voltage may be provided instead of installing the protection circuit 35.

As described above, the external connection terminals 60 and 60c, the connection wiring 70, and the connection part 65 (or 69) may be configured by the same manner as in the first to third illustrative embodiments and may acquire the same effect as the first to third illustrative embodiments.

Fifth Illustrative Embodiment

Figure 17:
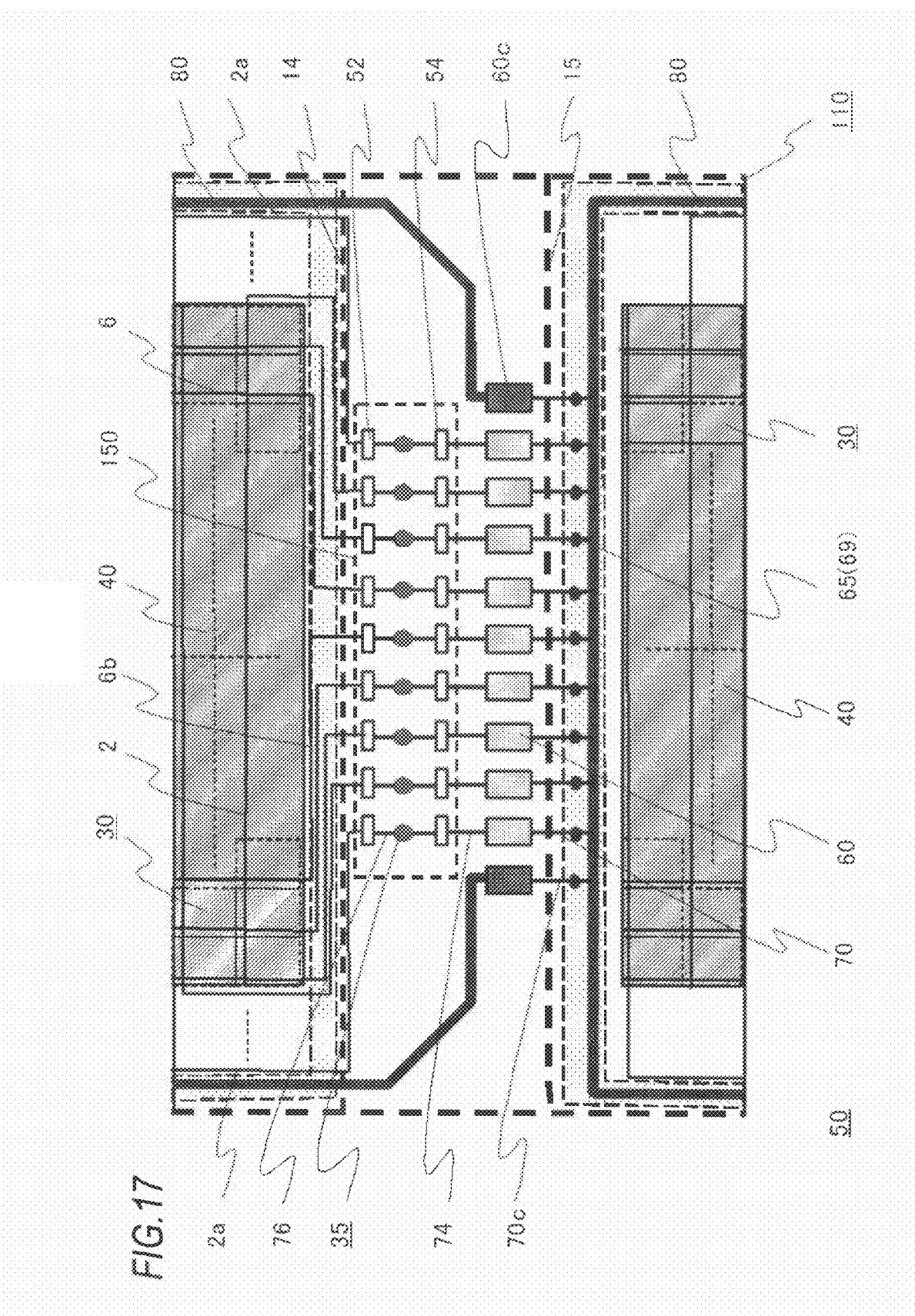
FIG. 17 is an enlarged plan view illustrating a cutting near-region S where liquid crystal panels, which are adjacent in the up-down direction, are cut off in an array substrate according to a fifth illustrative embodiment of this disclosure.

FIG. 17 is an enlarged plan view illustrating a cutting near-region S where liquid crystal panels, which are adjacent in the up-down direction, are cut off in an array substrate according to a fifth illustrative embodiment of this disclosure.

In the fifth illustrative embodiment, there is no auxiliary common wiring 81 of the fourth illustrative embodiment, and the driving circuit output terminal 52 and the driving circuit input terminal 54 are connected each other through a driving circuit input-output terminal connection wiring 76 where the protection circuit 35 is provided in the middle of the wiring. Even in a manufacturing process before mounting the driving circuit 150 by the driving circuit input-output terminal connection wiring 76, the driving circuit output terminal 52 connected to the scanning wiring 2 and the signal wiring 6 is connected to the driving circuit input terminal 54 through the driving circuit input-output terminal connection wiring 76.

Although the driving circuit output terminal 52 corresponds to the driving circuit input terminal 54 one to one in FIG. 17, a plurality of driving circuit output terminals 52 may be connected to a single driving circuit input terminal 54 through the driving circuit input-output terminal connection wiring 76 having the protection circuit 35.

Herein, with respect to the driving circuit input-output terminal connection wiring 76 having the protection circuit 35, connections may be made between the driving circuit output terminal 52 and the driving circuit input terminal 54 so that the potential between the driving circuit output terminal 52 and the driving circuit input terminal 54 may be to become the same. The reason is because leakage current easily flows between the driving circuit output terminal 52 and the driving circuit input terminal 54, if the potentials of the driving circuit output terminal 52 and the driving circuit input terminal 54 while the general driving are substantially different from each other.

The driving circuit input wiring 74 connects the driving circuit input terminal 54 and the external connection terminal 60. The connection wiring 70 extending from the external connection terminal 60 is connected with the common wiring 80 of the adjacent liquid crystal panel 50.

As in the first to fourth illustrative embodiments, the common wiring 80 is connected to the external connection terminal 60c, and connected to the common wiring 80 of the adjacent liquid crystal panel 50 by the connection wiring 70c.

Herein, the external connection terminals 60 and 60c, the connection wirings 70 and 70c, and the connection part 65 (or 69) may be configured by the same manner as in the first to fourth illustrative embodiments, and the configuration may acquire the same effect as the first to fourth illustrative embodiments.

Sixth Illustrative Embodiment

In the first illustrative embodiment, the connection part 65 having the contact hole 64 is disposed at the area where the sealing member 95 is formed, but may be disposed at the inner side which is the display area 40 side than the area where the sealing member 95 is formed.

Figure 18:
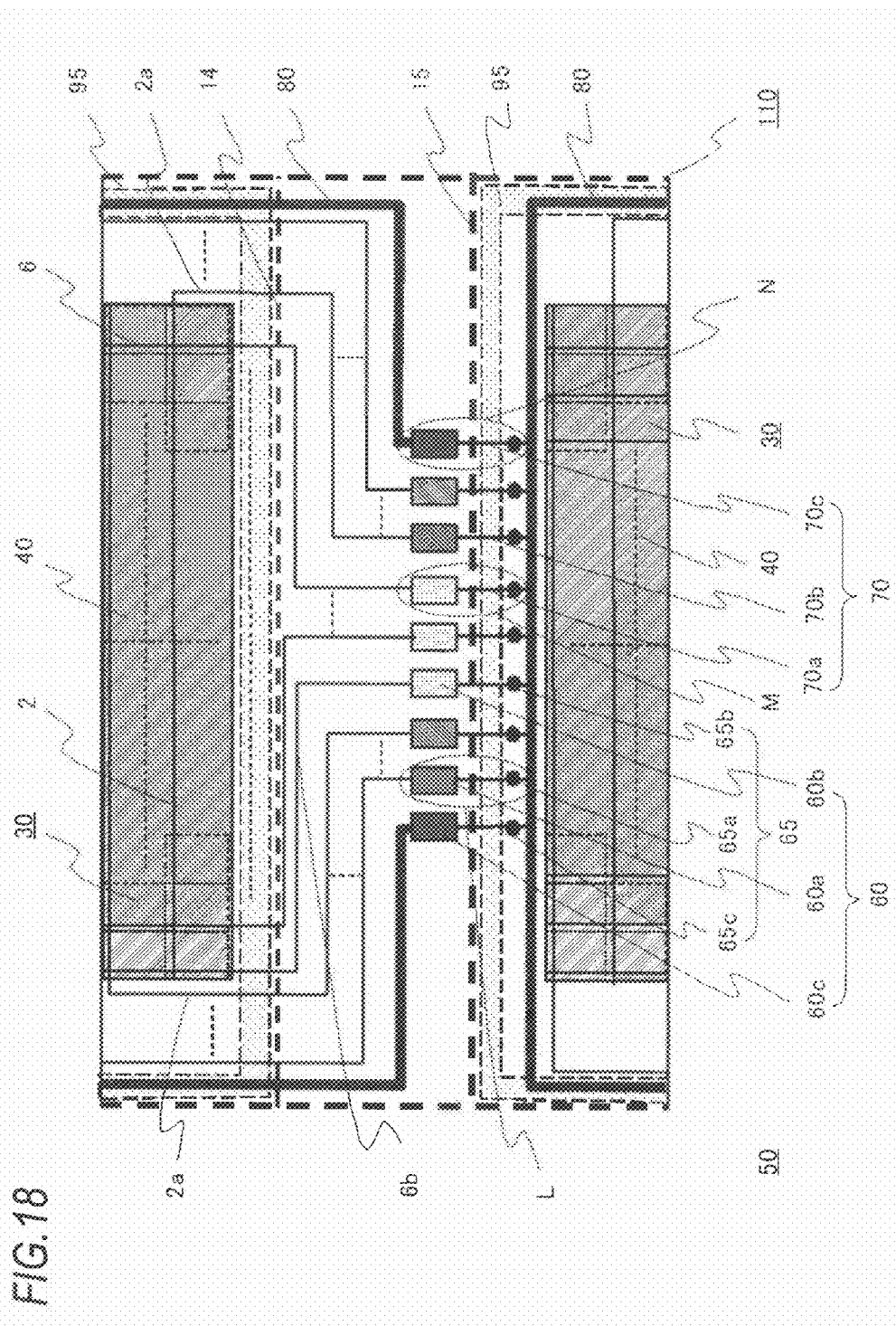
FIG. 18 is an enlarged plan view illustrating a cutting near-region S where liquid crystal panels, which are adjacent in the up-down direction, are cut off in an array substrate according to a sixth illustrative embodiment of this disclosure.

For example, FIG. 18 is an enlarged plan view illustrating a cutting near-region S where liquid crystal panels, which are adjacent in the up-down direction, are cut off in an array substrate according to a sixth illustrative embodiment of this disclosure. The illustrative embodiment is different from the first illustrative embodiment in that the connection part 65 is disposed at the inner side which is the display area 40 side than the sealing member 95. Even in the illustrative embodiment, since the connection part 65 is not in contact with moisture in air causing the corrosion, it is unlikely that a coating defect of the connection layer 18 occurs in the connection part 65 having the contact hole 64 or the corrosion of the common wiring 80 occurs below the defected area such as a pin hole, so that reliability of the liquid crystal display 100 is improved.

As in the sixth illustrative embodiment, the configuration, in which the connection part 65 connecting the connection wiring 70 and the common wiring 80 of the adjacent display panel 50 is disposed at the inner side which is the display area 40 side than the sealing member 95, is a modified example in which only the layout relationship of the sealing member 95 and the connection part 65 is different as compared to the first illustrative embodiment.

As described above, the configuration of the present illustrative embodiment, in which the connection part 65 (or 69) is disposed at the inner side which is the display area 40 side than the sealing member 95, may be applied even to the second to fifth illustrative embodiments as modified examples in addition to the first illustrative embodiment and may acquire the same effect as the first to fifth illustrative embodiments.

In the first to sixth illustrative embodiments, as shown in FIG. 1, when there exists the auxiliary connection wiring 72 connecting between the common wirings 80 of the liquid crystal panels 50 adjacent in the right-left direction and the connection part having the contact hole, the connection part of the auxiliary connection wiring 72 and the common wiring 80 may be disposed at the area where the sealing member 95 is formed or at the inner side which is the display area 40 side, in view of occurring of the same corrosion.

In this description, the TFT is a channel etch inverted stagger type, but an etch stopper inverted stagger type, a top gate type, or the like may be applied.

The driving circuit may also be applied to the array substrate and the liquid crystal display formed by the pixel TFT, polysilicon TFT or the like.

In the first to sixth illustrative embodiments, the liquid crystal display is exemplified as the array substrate and the display device, but this disclosure is not limited to the liquid crystal display, and the first to sixth illustrative embodiments may also be applied to an array substrate and a display device of self-emitting EL, FED, or the like, or a reflective electronic paper or the like using particles or oil drops, as long as the sealing member bonding the opposite substrate disposed to face the display area is formed.

What is claimed is:

1. An array substrate comprising:
    a plurality of display areas, which plurality of display areas is disposed on an insulation substrate, and which respectively configures a display panel, wherein a plurality of pixels is provided in a matrix form in the display areas and respectively includes a switching element and a pixel electrode disposed in a region in which a scanning wiring and a signal wiring cross each other;
    an outer area of the display area, in which outer area a common wiring which is configured to apply a reference potential to the pixels, and an external connection terminal which is connected to one of the scanning wiring, the signal wiring and the common wiring, are provided;
    a connection wiring which connects the external connection terminal with the common wiring of an adjacent display panel; and
    a connection part, which has a contact hole, provided at the common wiring of the adjacent display panel, wherein the connection wiring is provided between the external connection terminal and the connection part;
    a sealing member provided adjacent the outer area of the display area to bond the insulation substrate with an opposite substrate disposed to face the display area,
    wherein the connection wiring is disposed across a cutting position of the insulation substrate and is connected to the contact hole at the connection part, and
    wherein the connection part is disposed at an area at which the sealing member is provided, or at an inner, display area side of the sealing member.

2. The array substrate of claim 1,
    wherein the connection wiring is configured by extending a conductive layer that configures a part of the external connection terminal.

3. The array substrate of claim 1,
    wherein the connection wiring and the common wiring of the adjacent display panel are connected with each other by a connection layer formed at the same layer as the pixel electrode.

4. The array substrate of claim 1,
    wherein the connection layer is an oxide conductive layer.

5. A display device assembled by using the array substrate of claim 1.

* * * * *